United States Patent [19]
Wellen et al.

[11] Patent Number: 5,714,000
[45] Date of Patent: Feb. 3, 1998

[54] FINE-CELLED FOAM COMPOSITION AND METHOD

[75] Inventors: Clyde W. Wellen, Houston; Douglas K. Stephens, Dickinson; Greg R. Wellen, Houston, all of Tex.

[73] Assignee: Agritec, Inc., Houston, Tex.

[21] Appl. No.: 677,875

[22] Filed: Jul. 10, 1996

Related U.S. Application Data

[63] Continuation-in-part of Ser. No. 642,925, May 6, 1996, abandoned.

[51] Int. Cl.$^6$ .......................... C04B 12/04; C04B 38/00; C04B 38/10
[52] U.S. Cl. .......................... 106/601; 106/602; 106/603; 106/605; 106/618; 106/619; 106/624; 106/634; 106/122; 106/610; 264/41; 264/42; 264/45.1; 264/50; 264/45.3; 501/80; 501/84
[58] Field of Search .......................... 106/601, 602, 106/603, 605, 618, 619, 634, 122, 624, 610; 264/42, 41, 45.1, 50, 45.3; 501/80, 84

[56] References Cited

U.S. PATENT DOCUMENTS

| | | | |
|---|---|---|---|
| 3,741,898 | 6/1973 | Mallow et al. | 106/601 |
| 3,856,539 | 12/1974 | Mallow et al. | 106/601 |
| 4,084,980 | 4/1978 | Motoki | 106/601 |
| 4,488,908 | 12/1984 | Goodwin et al. | 106/602 |
| 5,503,931 | 4/1996 | Goodman, Sr. | 106/618 |

*Primary Examiner*—Michael Marcheschi
*Attorney, Agent, or Firm*—James F. Weiler

[57] ABSTRACT

Disclosed is a rigid fine-celled foam composition and a method of producing it. The foam composition is nontoxic, environmentally friendly, has improved absorption/adsorption and retention of liquids, is not as hard as prior art foams, does not include polymerization by-products detrimental to flower and plant life, and is a foamed mixture of a caustic silicate solution derived from the caustic digestion of rice hull ash having diffused activated carbon particles from thermal pyrolysis of rice hulls rather than from commercial sodium silicate solutions. Valuable by-products of commodity grade are obtained including activated carbon and sodium fluoride.

11 Claims, No Drawings

FINE-CELLED FOAM COMPOSITION AND METHOD

CROSS-REFERENCE TO RELATED APPLICATION

This application is a continuation-in-part of application Ser. No. 08/642,925, filed May 6, 1996, now abandoned.

FIELD OF THE INVENTION

The present invention relates to fine-celled, rigid foams for retention of liquids for floral, agricultural, nursery and horticulture use, such as for cut flowers, plant propagation mediums and growth cubes, soil conditioners, mulches, and the like.

BACKGROUND OF THE INVENTION

Current commercial floral and horticultural foams are phenol/formaldehyde foams which are potential health hazards and have environmental problems because both phenol and formaldehyde are toxic chemicals subject to Section 313 of Title III of the Superfund Amendments and Reauthorization Act (SARA) of 1986 and 40 C.F.R. Part 372 reporting requirements. Also, formaldehyde is listed as a carcinogen by the National Toxicology Program (NTP), the International Agency for Research on Cancer (IARC), and the American Conference of Government Industrial Hygienists (ACGIH). Smithers-Oasis, U.S.A., and other companies currently market a phenol/formaldehyde foam ("PF foams"), and California presently requires the following label on PF foams: "Warning! This product contains a chemical known to the State of California to cause cancer."

Attempts have been made to provide nontoxic, environmentally friendly floral, agricultural, and horticultural foams, but to applicant's knowledge, none of these foams have been acceptable to the industry. One such unsuccessful attempt has been to develop silica foams by using the industry standard sodium silicate consisting of a water solution of sodium oxide ($Na_2O$) and silicon dioxide ($SiO_2$) with the ratio of $SiO_2$ to $Na_2O$ at 3.22 and the soluble solids at 39.3 percent. This silica foam was produced in a continuous, high speed mixer by injecting a surface tension depressant (tall oil mix) and polymer forming agent (sodium fluorosilicate) into the sodium silicate. Also, cotton reinforcing fibers, such as cotton flock (260 microns) were mixed with sodium silicate to provide cohesive strength in the resulting foam, and coloring agents were added to provide the desired color. The final dry density of the foam was controlled by the injection of compressed air or nitrogen into the mixer. While this process and these raw materials produced a silica foam product with fine cells in the 40 to 60 microns diameter range, the best achievable liquid retention was at the 39 volume percent level due to capillary repulsion in the cellular structure. Another undesirable property of this foam was its hardness at the lowest practical density of near 4 pounds per cubic foot. When used as a floral foam for insertion of cut flowers, the hardness limited its use to large-stemmed flowers, and even then there was potential damage to the stems while inserting the flowers.

U.S. Pat. Nos. 3,741,898 and 3,856,539 produced silica foam products without the inclusion of any substantial amounts of fillers or reinforcements. By "substantial amounts" of fillers or reinforcements was stated to be an amount in excess of about 10 percent on a dry basis or about 3 percent by weight of the alkali metal silicate (commercial sodium silicate) raw material on a wet basis. These foam products were produced for use as structural and insulation materials but were never acceptable by the floral, agricultural, nursery, and horticulture industries.

The terms "silica" and "silicate" have been used interchangeably in the trade. In the foregoing patents, a silica foam product from sodium silicate solution is defined as not having over a substantial amount of filler (10 percent) of filler or reinforcement materials. In the present invention, considerably in excess of 10 percent "filler" and reinforcement material, such as activated carbon, and cellulosic fibers are present; and the caustic silicate solution derived from caustic digestion of rice hull ash has about ½ percent by weight of metals.

It would be highly desirable to provide a fine-celled, rigid foam composition which has improved absorption/adsorption and retention of liquids, which is not as hard as prior art foams so that, when used as a floral foam for insertion of cut flowers, hardness does not limit its use to large stem flowers and does not damage stems of the flowers while inserting them in the foam, which contains no harmful concentrations of polymerization by-products, such as sodium fluoride which is detrimental to cut flowers' life, does not require the addition of expensive coloring agents, and accordingly is desirable and suitable for floral uses.

It is also highly desirable to provide a foam composition suitable and useful as a propagation medium or blocks for plant and other agricultural cuttings, seeds, seedlings, nursery stock, trees, as soil conditioners, mulches, and the like.

It is also highly desirable to provide such a foam composition which is inexpensive, utilizes waste products, rice hull ash having diffused activated carbon throughout, and has valuable by-products acceptable to the various industries to which they pertain.

SUMMARY OF THE INVENTION

The present invention is directed to a rigid foam composition and its method of production which produces a fine-celled, rigid foam having a hardness so that cut flowers and plant clippings can readily and easily be inserted into the foam without damage to the stems or clippings while inserting them, which utilize a caustic solution of amorphous silica containing carbon derived from thermal pyrolysis of rice hull ash containing diffused carbon which has been activated thereby, which activated carbon passes through as an inert material during caustic digestion and synergistically acts with the amorphous silica cellular structure to absorb/adsorb and retain more liquid than foams of the prior art, and which is free of water soluble sodium fluoride and other by-products and reactants of the foaming process. Unexpectedly, the thermal pyrolysis and caustic digestion reduce the size of the activated carbon particles to where they do not disrupt the foam's cellular structure thus improving liquid absorption/adsorption.

The process of the invention is the production of the rigid foam composition by foaming a mixture of a caustic silicate solution comprised of amorphous silica derived from caustic digestion of rice hull ash which contains activated carbon formed during the thermal pyrolysis and is an inert during the caustic digestion, a surface tension depressant, a polymer forming agent, and reinforcing fibrous material of the cellulosic family, such as cotton flock. The activated carbon acts synergistically with and does not interfere with the resulting foamed composition's fine cellular structure to absorb/adsorb and retain liquid and has its particle size reduced by the thermal pyrolysis and caustic digestion so that it does not disrupt the foam composition's cellular structure. Any and all by-products of the foaming are removed including sodium fluoride, excess reactants, and surface tension depressants.

Commercially available rice hull ash currently is produced by gasification or by combustion or burning rice hulls in a furnace. Thermal pyrolysis is a chemical change that occurs in a substance through the application of heat. Combustion is the act or process of burning or a chemical change, especially oxidation, accompanied by the production of heat and light. In both, primarily amorphous rice hull ash having activated carbon diffused throughout is produced. Advantageously, during the thermal pyrolysis of rice hulls and caustic digestion of the resulting rice hull ash the activated carbon particles are reduced to sizes that are consistently smaller than commercially available granular activated carbon (GAC) and powdered activated carbon (PAC) and which do not disrupt the normal cellular structure of the foamed product.

For convenience, the term "thermal pyrolysis" includes combustion, gasification, and any and all forms of heat which produces rice hull ash and activated carbon from rice hulls.

Any process in which thermal pyrolysis is used to produce rice hull ash and activated carbon from the rice hulls may be used in the present invention.

In the current burning or combustion process, raw rice hulls are continuously added to the top of the furnace, and the ash is continuously removed from the bottom. Temperatures in the furnace generally range from 800° F. to about 1400° F., and the residence time for the ash in the furnace is about three minutes. Upon leaving the furnace, the ash is rapidly cooled to provide ease in handling. When treated by this method, silica remains in a relatively pure amorphous state rather than in the crystalline forms known as quartz, tridymite, or crystobalite. Transition from the amorphous to the crystalline state generally takes place when the silica is held at very high temperatures, for example 2000° F. for longer periods of time. The significance of having the silica in an amorphous state is that the silica maintains a porous skeletal structure rather than migrating to form crystals, and the amorphous form of silica does not cause silicosis thus reducing cautionary handling procedures. The burning or combustion of the rice hulls is time-temperature related, and burning of these hulls under these conditions produces rice hull ash having carbon particles from the burning of the hulls which activates the carbon. Conventional combustion of rice hulls produces from about 3 percent to about 13 percent by weight of activated carbon. The amount of activated carbon present in the rice hull ash is dependent on the amount of combustion. If the amount of activated carbon in the rice hull ash used in the foaming process and in the foamed composition cannot be used advantageously in making floral, agricultural, nursery, and horticultural foams, such excess activated carbon can be separated from the caustic digested rice hull ash silicate solution and is a very valuable and exceedingly pure activated carbon product. While amorphous rice hull ash is preferred, some crystalline rice hull ash can be present.

In the current gasification of rice hull ash, conventional coal gasification equipment is used. Rice hulls are heated in a furnace at temperatures of about 800° F., the gas is collected and then burned to produce energy, and rice hull ash including activated carbon is recovered. The amount of activated carbon ranges up to 40 percent by weight or more. Any or all excess activated carbon can be removed by conventional filtration processes and equipment and is a valuable commodity.

Generally, in the commercial burning of rice hulls as an energy source, the resulting ash includes about ½ percent of trace metals, such as magnesium, potassium, iron, aluminum, calcium, titanium, and manganese.

The production of a caustic silicate solution from amorphous rice hull ash is a caustic digestion process. Rice hull ash is heated with a caustic solution, such as sodium hydroxide (NaOH), which reacts with the solid silica ($SiO_2$) to create the sodium silicate solution. The principal chemical reaction is characterized as follows: $2NaOH + nSiO_2 + H_2O \rightarrow Na_2O:n(SiO_2) + H_2O$ where "n" represents the silica/alkali weight ratio.

For the current industry standard solution, the chemical equation becomes: $2NaOH + 3.22\ SiO_2 + H_2O \rightarrow Na_2O:3.22\ (SiO_2) + H_2O$.

In addition to sodium hydroxide, sodium carbonate/calcium oxide reaction products, sodium hydroxide by-product liquors, and low grade soda ash/lime sources, as well as others, can be used in the caustic digestion process.

Present commercial grades of liquid sodium silicates not derived from rice hull ash range in silica/alkali weight ratio from about 1.6 to about 3.8. Such ratios are satisfactory for rice hull ash derived liquid sodium silicate in the present invention.

As previously mentioned, during the thermal pyrolysis of rice hulls and the caustic digestion of the amorphous rice hull ash to produce a sodium silicate solution, the activated carbon particles are reduced to sizes that are consistently smaller than commercially available granular activated carbon (GAC) and powdered activated carbon (PAC). Common crushed granular activated carbon sizes are 12×40 and 8×30 U.S. standard mesh, which range in diameter from 1,680 to 425 microns and 2,380 to 590 microns, respectively. Commercially available PACs typically have particle sizes of 65 to 90 percent passing a U.S. Standard 325 mesh (45 microns) sieve. The activated carbon in the unrefined sodium silicate solution derived from the caustic digestion of rice hull ash has particle sizes of 100 percent passing a U.S. Standard 500 (25 microns) sieve, with the average size of about 12 microns diameter.

The particle sizes of the suspended solids, such as activated carbon, in the caustic silicate solution raw material are critical because larger particles disrupt the normal cellular structure in the polymerized silicon dioxide foam product. This disruption results in decreased absorption/adsorption and retention of liquids. Also, the larger carbon particles tend to increase the hardness, which can cause damage to the flowers' stems while inserting them in the foam. The particle size distribution is also important because the smaller carbon particles adsorb more rapidly than larger particles.

The composition of the invention comprises a rigid, fine-celled foam product or composition comprised of amorphous precipitated silica from thermal pyrolysis of rice hulls, activated carbon from the thermal pyrolysis of the rice hulls and which passes as an inert material through the caustic digestion process, has a particle size not disruptive of the fine cellular structure of the foam composition, cellulosic fibers, and hydrated water. Preferably, the foam comprises by weight about 50 to 63 percent substantially amorphous precipitated silica, about 4 to 6 percent fiber, about 13 to 27 percent activated carbon, about 16 to 19 percent water hydrate, a majority cell size of about 40 to 60 microns diameter, has a dry density of from about 5.0 pounds to 6.0 pounds per cubic foot, and trace metals 0.5 to 1.0.

Accordingly, it is an object of the present invention to provide a foam composition and its method of production, which foam composition has reduced hardness from the prior art foams, which has improved liquid absorption/adsorption and retention, which is free of contaminants such as fluorides or excess reactants, needs no added coloring agents, and in which cut flower stems, plant clippings, and the like can be readily and easily inserted into the foam with about 48 to 56 percent less pressure than prior art foams, and is suitable for floral and horticultural uses, such as propagation mediums or blocks for plant and other agricultural cuttings, seeds, seedlings, or soil conditioners, mulches, has valuable by-products, and the like.

It is a further object of the present invention to provide such a foam composition which is inexpensive, has major components made from a waste product and which has valuable by-products acceptable to the industry.

Other and further objects, features, and advantages of the invention are set forth throughout the specification and claims and are inherent in the invention.

DESCRIPTION OF PRESENTLY PREFERRED EMBODIMENT

The present invention is directed to a process and a foam product which utilizes a caustic silicate solution produced by the caustic digestion of rice hull ash obtained by thermal pyrolysis of rice hulls. Activated carbon is generated during this process which passes through the caustic digestion as an inert material and which is of a particle size which does not disrupt the cellular structure of the foam product. The activated carbon in the foam product acts synergistically with the cellular structure to absorb/adsorb and retain substantially more liquid than prior art foams.

The method of the invention comprises foaming a mixture of a caustic silicate solution which has been derived by caustic digestion of rice hull ash containing activated carbon diffused therethrough formed from thermal pyrolysis of rice hulls, which activated carbon passes as an inert during the caustic digestion process and which is of reduced particle size which does not interrupt the cellular structure of the resulting foamed product, a surface tension depressant, a polymer forming agent, and inert reinforcing fibers, removing by-products, excess reactants and surface tension depressant, and forming the resulting foam composition into desired structural shapes, such as three dimensional solid shapes suitable for floral, agricultural, nursery, and horticultural shapes and medium. Preferably for floral shapes, the resulting solid shapes are sprayed with a polymer solution which minimizes dust and a preservative to prolong life of cut flowers having their stems inserted into the solid shapes.

The resulting foam is a rigid, fine-celled foam product or composition comprised of amorphous precipitated silica from thermal pyrolysis of rice hulls, activated carbon from the thermal pyrolysis of the rice hulls and which passes as an inert through the caustic digestion process, has a particle size not disruptive of the fine cellular structure of the foam composition, cellulosic fibers, and hydrated water. Preferably, the foam comprises by weight about 50 to 63 percent substantially amorphous precipitated silica, about 4 to 6 percent fiber, about 13 to 27 percent activated carbon, about 16 to 19 percent water hydrate, a majority cell size of about 40 to 60 microns diameter, has a dry density of from about 5.0 pounds to 6.0 pounds per cubic foot, and trace metals 0.5 to 1.0. The following Example 1 is a presently preferred method for making the foam composition of the invention.

EXAMPLE 1

A sodium amorphous silicate solution from rice hull ash (RHA) is analyzed to determine the $SiO_2/Na_2O$ ratio, the soluble solids (Si:Na solids), the suspended solids (carbon+unreacted RHA), the total solids, and the weight percent water in the unrefined RHA sodium silicate. These properties are critical to the overall chemical reaction balance regarding quantity of polymer forming agent to utilize.

The sodium amorphous silicate from RHA is premixed with 2.6 percent by weight cotton flock reinforcing fibers (260 microns in length) utilizing a mechanical agitator.

The sodium fluorosilicate (SFS, preferred polymer forming agent) is analyzed to determine percent solids in the aqueous solution. The preferred SFS solids range is 50 percent to 60 percent by weight of the aqueous solution.

A surface tension depressant, preferably tall oil mix, is prepared by mixing 80 percent distilled tall oil with 20 percent oleic acid.

The three raw material feed streams are placed in appropriate sized tanks or vessels which are connected via piping systems to positive displacement pumps. The preferred pumps are ROBBINS MYERS MOYNO® pumps capable of pumping viscous slurries with abrasive solids.

The pumps are set to feed the three streams at the following ratio on an anhydrous basis (reactive solids basis): $Na_2O:SiO_2$—100 weight parts/$Na_2SiF_6$—36.83 weight parts/Tall oil mix—2 weight (liquid) parts. This is the exact theoretical stoichiometric ratio for the reaction to achieve 100 percent completion. In actual practice, the feed ratios have been varied from a low of 100 parts $Na_2O:SiO_2$ to 41.7 parts SFS; to a high of 100 parts $Na_2O:SiO_2$ to 33.8 parts SFS. The preferred ratio is as close to the stoichiometric as practical in order to reduce unreacted components that have to be removed from the foam product by further processing.

The reactants are pumped to a continuous, high speed (500–600 RPM), high shear mixer, which produces the wet foam dispensed into molds. There are several commercial mixers available including those manufactured by: E. T. Oakes Corporation (preferred), Perpetual Machine Company, Charles Ross & Son Company, and others. Accordingly, no detailed description is deemed necessary or given.

Compressed air or nitrogen is injected into the mixer at a rate to produce the desired wet foam density ranging from 12 to 15 pounds per cubic foot. Lower densities reduce water retention because it makes cellular pores larger. Higher densities make the foam too hard for floral and horticultural use.

The wet foam is dispensed through a hose attached to the mixer outlet into molds, which are filled to capacity and then covered with a moisture barrier top.

The wet foam in the molds is allowed to set in place for a period of 24 to 48 hours to allow excess liquid drainage and curing reaction.

The damp foam is then removed from the molds and placed in a leaching facility for removal of the unwanted by-product, sodium fluoride (NaF), any excess reactants, and any tall oil mix residue.

The leaching process is accomplished by flowing hot water (200°–210° F.) through the foam product for a period of two to three hours. This removes the water soluble NaF and flushes other contaminants out of the cellular structure. This leaching process is time-temperature dependent and can be accomplished with cold water for a longer period of time. The hot water leach is followed by a cold water leach for about the same time to cool and open the cells in the foam. Advantageously, the NaF can be precipitated or distilled out of the leachate and recovered by conventional procedures. The recovered NaF is 97 percent pure and hence of a commodity grade which can be marketed commercially.

The progress of both leaching processes is monitored by frequent measurements of the leachate water for pH, total dissolved solids (TDS), and fluoride ions. This process is complete when the leachate from the foam product approaches the same pH, TDS, and fluoride ionic concentration as the raw starting "tap" water.

The foam product is then dried by forced convection and infrared heaters.

After drying, the foam product is cut into the desired three dimensional shapes and sizes, such as bricks or may be ground or crumbled for mulch, soil amendment, and the like. For floral foam product this is approximately 9 inches by 4 inches by 3 inches rectangular bricks.

A polymer solution is then sprayed on the outer surfaces of the bricks to minimize dust and particles dislodgement during shipment.

The floral foam has a commercial preservative spray applied along with the polymer solution.

A floral, horticultural, nursery, and agricultural foam composition with acceptable properties regarding liquid absorption, adsorption, and retention, and "softness" was produced utilizing rice hull ash sodium silicate compositions as set forth above.

The properties and composition of the foam composition produced by the processes in Example 1 are within the ranges set forth in the following Table 1.

TABLE 1

| Dry density | 5.0 to 6.0 lbs per cubic foot |
| Silicon dioxide (SiO$_2$) | 52.34 to 62.83 weight percent |
| Activated Carbon | 13.10 to 26.81 weight percent |
| Cotton | 4.70 to 5.49 weight percent |
| Hydrated water | 15.74 to 18.93 weight percent |
| Sodium fluoride (NaF) | <3 ppm |
| Trace metals | 0.5 to 1.0 weight percent |

It is well known that any amount of water soluble polymer added to floral foam products can have a detrimental effect on the flowers that are inserted into the foam. Therefore, the preferred compound for use in minimizing the "dustiness" is polyvinylpyrrolidone, PVP K-15 or PVP K-30, which are lower molecular weight polymers. Other polymers which could be utilized include: polyethylene glycol (PEG), acrylic or acrylate polymers, starch based with side grafted acrylates, certain vinyl acetate polymers, and others. These are all commercially available, and no detailed description thereof is given or deemed necessary. The PVP polymer is manufactured by ISP Technologies Inc. and is one of the active ingredients in hair spray.

Preferably, by weight in the feedstocks the rice hull ash caustic silicate solution comprises 78 percent to 81 percent, the activated carbon in the rice hull ash silicate solution comprises 6 percent to 15 percent and has a particle size of up to 25 microns and preferably about 12 microns in diameter, the surface tension depressant comprises 1.00 percent to 2.00 percent, the polymer forming agent solution comprises from 17.00 percent to 22.00 percent, and the reinforcing fibers 2.00 percent to 3.00 percent.

While cotton flock is the preferred reinforcing fiber, other reinforcing fibers may be used, such as cellulose fibers. The reinforcing fibers should not be too hard as they would increase the hardness of the foam. The length of the reinforcing fibers should not be so long as to disrupt the cell structure of the foam and lessen water retention and not so short to reduce the cohesive strength properties of the foam. A satisfactory range of fiber length is from 250 to 300 microns, and 260 microns is presently preferred and is a standard length available on the market.

Any desired surface tension depressant can be utilized, preferably from the chemical family of fatty acids, rosin acids, coconut fatty acid, tall oil fatty acid (FA-3), and the like.

The preferred preservative is commercially available from Floralife, Inc. Other preservatives include: sorbic acid, potassium sorbate, benzoic acid, and others. These are all commercially available, and no detailed description thereof is given or deemed necessary.

In the event the activated carbon in the caustic silicate solution is above the upper preferred limits set forth herein, it can be removed by conventional filtration procedures and apparatus readily available on the market such as EIMCO Process Equipment, Kason Corporation, Frontier Technology, Inc., and others. If desired, all of the activated carbon in the caustic silicate solution can be removed and marketed separately as a commodity.

EXAMPLE 2

The following is an example of a prior art process to produce a floral foam product.

The process utilized was to inject three raw feed material streams into an Oakes high speed, high shear mixer via positive displacement pumps. A commercial (non rice hull ash) sodium silicate stream had been pre-mixed with cotton flock (260 microns in length) at a concentration of 2.6 percent by weight. Thus, the total solids (soluble+ suspended) were in the range of 41 to 42 percent in a 58 to 59 percent water solution. The polymer forming agent stream was 53 percent sodium fluorosilicate powder (particle size at 5 microns) plus 1.5 percent pigment solids in a 45.5 percent water solution. The surface tension depressant stream was comprised of 80 percent distilled tall oil and 20 percent oleic acid. The sodium silicate/cotton flock slurry was heated to 105° F. to 110° F. prior to injection into the mixer. This reduced the viscosity and increased the rate of reaction with the sodium fluorosilicate. The feed ratios were: Wet Basis—300 parts sodium silicate slurry to 77 parts sodium fluorosilicate slurry to 6 parts tall oil mix liquid or Dry Solids Basis: 100 parts Na$_2$O: 3.22 SiO$_2$ solids to 36.4 parts Na$_2$SiF$_6$ solids to 2 parts tall oil mix liquid. Air or nitrogen was injected at a pressure of 80–100 psig into the sodium silicate stream just prior to entering the mixer. The mixer was operated at 500–600 RPM with a back pressure in the mixer head of 40–80 psig.

The foam product was dispensed through a hose from the mixer outlet into molds. After the molds were filled to capacity, a moisture barrier covering was placed over the tops to maintain near 100 percent humidity. The foam product was allowed to stay in the molds for a period exceeding 24 hours to allow for polymerization to proceed and to provide excess water drainage. The foam product in the molds had a wet density of 10 to 11 pounds per cubic foot.

The polymerization reaction of the prior art floral foam yielded the unwanted by-product sodium fluoride (NaF) at about 25 percent by weight concentration in the dry foam. After the floral foam was removed from the molds, it required further processing to remove the NaF, any excess reactants, and the residual tall oil liquid. This removal was accomplished by repetitive leaching treatments with hot (>200° F.) and cold (70°–75° F.) water solutions of soda ash ($Na_2CO_3$) and potassium chloride (KCl). These repetitive treatments took up to 7 to 8 hours with the water solution temperatures ranging from 70° to 205° F. These treatments also completed the curing process for the foam product. After the leaching treatments, the floral foam was dried by a combination of convection and infrared heaters for a period of 48 to 72 hours.

The prior art floral foam product had a dry density of 4.0 to 4.5 pounds per cubic foot with the following composition by weight: $SiO_2$=71 percent, Color pigment=2 percent, Cotton=5–6 percent, and hydrated water=21 to 22 percent, and required about 50 percent more force to insert the stems of the cut flowers than in the foam composition of Example 1.

EXAMPLE 3

This is an example of an attempt to produce an acceptable floral foam product utilizing a commercial sodium silicate solution with the $SiO_2/Na_2O$ ratio at 3.22 to 1 and 39.2 percent by weight Si:Na soluble solids in a 60.8 weight percent water solution; to which was added 8.03 percent by weight commercial granular activated carbon (GAC) with 20×50 U.S. Standard mesh particle sizes (850 to 300 microns diameter). Cotton flock (260 microns size) was mixed at 3.0 percent by weight and additional water was added to reduce the Si:Na soluble solids to about 34.0 percent by weight. This final composition closely approximates that of the sodium silicate solution from rice hull ash utilized in Example 1.

The commercial sodium silicate solution, polymer forming agent stream (60 percent sodium fluorosilicate in 40 percent aqueous solution), surface tension depressant stream (tall oil mix), and compressed nitrogen were fed to the high speed (500–600 RPM), high shear mixer at the same rates as Example 1. The resulting foam product was further processed in the same manner as Example 1.

The composition of the foam product utilizing the commercial sodium silicate was within the ranges set forth in Table 1. However, the physical properties deteriorated with the liquid absorption/adsorption and retention reduced by 29 volume percent as compared to the acceptable foam product of Example 1. Also, the force required to insert the flower stems into the foam increased by 121 percent to a level that can cause damage to the stems while inserting them into the prior art foam. The additional cost of the commercial sodium silicate and granular activated carbon (GAC) used in this example resulted in about a 115 percent increase in raw material cost as compared to utilizing the sodium silicate solution from RHA of Example 1.

EXAMPLE 4

This example is the same as Example 3 except powdered activated carbon (PAC) with a particle size of about 72 percent passing a U.S. Standard 325 mesh (45 microns) sieve was used in the commercial sodium silicate solution instead of the granular activated carbon (GAC). The processing conditions and foam product composition were essentially the same as Examples 1 and 3. The liquid absorption/adsorption and retention was 17 volume percent less than the acceptable foam product of Example 1. The hardness as determined by the flower stems insertion force was about 32 percent greater than Example 1. Since powdered activated carbon is more expensive, the cost of raw materials increased by 143 percent compared to Example 1.

For agriculture and horticulture, the foam composition or product of the present invention is used as a propagation medium; for example, seeds, seedlings, plant cuttings, such as nursery stock, poinsettia, orchid, rose cuttings, tree cuttings, and the like, or when ground as a soil conditioner, or mulch to control levels of water retention, and cause plant cuttings to react more quickly.

Additional components may be added to the foam composition or product of the present invention, such as nutrients and the like which are readily available in the commercial market, and no description thereof is deemed necessary or given.

Other and further uses of the foam of the present invention may be made such as for microwave and sound attenuation, filtration and liquid purification, industrial waste water containment and absorption, mediums for bioremediation, as a fire stop in hollow wall vessels and the like.

Accordingly, the present invention has the advantages and features and meets the objectives previously set forth.

While presently preferred examples of the embodiments of the invention have been given for the purposes of disclosure, changes can be made therein which are within the spirit of the invention as defined by the scope of the appended claims.

What is claimed is:

1. A method of making a rigid celled foam composition having a majority of its cells of a size of from about 40 to about 60 microns comprising, foaming a mixture of components comprising (a) a caustic silicate solution derived from caustic digestion of rice hull ash from thermal pyrolysis of rice hulls and containing diffused activated carbon formed during the thermal pyrolysis, (b) a surface tension depressant, (c) a polymer forming agent, and (d) inert reinforcing fibers, and removing by-products including sodium fluoride and unreacted components from the rigid foam composition.

2. The method of claim 1 including, forming the rigid celled foam composition into three dimensional shapes.

3. The method of claim 2 further comprising, spraying the three-dimensional shapes with a polymer solution in an amount effective to minimize dust.

4. The method of claim 2 further comprising, spraying the three-dimensional shapes with a preservative in an amount effective to preserve life of cut flowers when their stems are inserted into said shapes.

5. The method of claim 1 wherein, the rice hull ash caustic silicate solution comprises 78 percent to 81 percent by weight of the mixture, the activated carbon in the rice hull ash caustic silicate solution comprises from 6.00 percent to 15.00 percent by weight and has a particle diameter of not above 25 microns, the surface tension depressant comprises from 1.00 percent to 2.00 percent by weight of the mixture, the polymer forming agent comprises from 17.00 percent to 22.00 percent by weight of the mixture, and the inert reinforcing fibers in the rice hull ash caustic silicate solution comprises from 2.00 percent to 3.00 percent by weight of the mixture.

6. The method of claim 5 wherein, the surface tension depressant comprises 80 percent distilled tall oil mixed with 20 percent oleic acid, the polymer forming agent comprises sodium fluorosilicate, and the inert reinforcing fibers comprise cotton flock.

7. The method of claim 1 wherein, the caustic silicate solution is a sodium silicate solution.

8. The method of claim 1 further comprising, recovering the sodium fluoride from the resulting foam composition.

9. A rigid foam composition having a cell structure wherein a majority of cells of the cell structure have a size of from 40 to 60 microns, comprising, (a) silicon dioxide derived from rice hull ash and containing diffused activated carbon particles from thermal pyrolysis of rice hulls, the activated carbon particles being of a size not disruptive of the cells of the rigid foam composition, (b) reinforcing cellulose fibers, (c) hydrate and (d) less than 3.00 ppm sodium fluoride by-product, and wherein the foam composition has a dry density from 5.0 pounds to 6.0 pounds by weight per cubic foot, and a sufficient hardness so that cut flowers can be inserted into the foam composition without damage to their stems.

10. The rigid foam composition of claim 9 wherein, the silicon dioxide comprises about 50 percent to 63 percent by weight of the composition, the hydrate comprises about 15 percent to about 19 percent by weight of the composition, the reinforcing cellulose fibers comprise about 4.50 percent to 5.50 percent by weight of the composition, the activated carbon particles comprise about 13 percent to about 27 percent by weight of the composition and have a diameter of not over 25 microns, and including 0.500 to 1.00 weight percent of trace metal impurities.

11. The rigid foam composition of claim 9 wherein, the reinforcing cellulose fibers comprise cotton flock.

* * * * *